United States Patent [19]
Lob

[11] Patent Number: 5,449,154
[45] Date of Patent: Sep. 12, 1995

[54] BEARING ASSEMBLY FOR ROTARY SUPPORT OF A LINE

[75] Inventor: Charles J. Lob, Oconomowoc, Wis.

[73] Assignee: Harken, Inc., Pewaukee, Wis.

[21] Appl. No.: 111,285

[22] Filed: Aug. 24, 1993

[51] Int. Cl.⁶ .............. B66D 3/08; B66D 3/04; F16C 33/34
[52] U.S. Cl. .................. 254/394; 254/412; 254/417; 384/565
[58] Field of Search ............ 254/394, 403, 404, 411, 254/412, 417, 393; 384/565

[56] References Cited

U.S. PATENT DOCUMENTS

| | | | |
|---|---|---|---|
| 365,506 | 6/1887 | Dean | 384/565 |
| 386,826 | 7/1888 | Howard | 254/417 |
| 1,552,161 | 9/1925 | Houghton | 254/417 |
| 1,984,274 | 12/1934 | Librett | 254/417 |
| 3,528,645 | 9/1970 | Harken | 254/412 |
| 4,491,301 | 1/1985 | Pendola | 254/404 X |

FOREIGN PATENT DOCUMENTS 954367  8/1982  U.S.S.R. ............... 254/417

*Primary Examiner*—Daniel P. Stodola
*Assistant Examiner*—Michael R. Mansen
*Attorney, Agent, or Firm*—Juettner Pyle Lloyd & Piontek

[57] ABSTRACT

The outer race of a roller bearing sheave is omitted so that the bearings are in direct engagement with a line. A retainer for the ends of the bearings is provided to allow the bearings to rotate and recirculate around an inner race. The rollers deflect portions of the line equally to equalize the load and to prevent high stresses on individual rollers.

8 Claims, 2 Drawing Sheets

BEARING ASSEMBLY FOR ROTARY SUPPORT OF A LINE

BACKGROUND OF THE INVENTION

This invention relates to devices in which a flexible member such as a line is partially wrapped for rotatable support, such as in a pulley or sheave, otherwise known as a bearing block.

A conventional sheave or pulley comprises a rigid inner circular race, an outer rigid race having an outwardly facing groove to receive a line, and some type of bearing means between the inner and outer race, such as low friction sleeve or ball, roller or other type of bearings. The outer race is frictionally engaged by a line and rotates around the inner race. Pulleys and sheaves are employed to change the direction and angle of pull of a movable line under tension. The load is transferred from the outer race, through the bearings into the inner race, and the inner race is attached to a support.

High capacity sheaves used on sailing vessels will typically use roller or other high strength bearings to carry the axial loads, with the bearings being composed of a metal or high strength self-lubricating polymer.

In connection with conventional blocks or sheaves, it has been found that the bearings incorporated to withstand the axial load are not loaded equally. For example, assume a conventional sheave using roller bearings and having a line wrap under tension around the outer race of 180° between, for example, 90° and 270°. The bearing or bearings at the 180° position carry the maximum load, with the loads decreasing on bearings to either side and decreasing to zero at the 90° and 270° locations. The remaining bearings, being located outside the zone of engagement with the line, are not under compression and do not carry any load.

From the above considerations, it will be appreciated that the most highly stressed or loaded bearings in a conventional sheave are located midway between the points where the line enters and exits from the sheave. As a consequence, the strength of the most highly stressed bearings determine the ultimate or maximum working strength of the sheave. In order to increase load capacity, stronger or heavier materials must be used, or additional bearings must be employed. Typically, this would require that the overall size or diameter of the sheave be increased.

Another concern of sheaves of this nature is the potential for the most highly stressed bearings to permanently distort when subjected to high static loads over a long period of time. For example, many sheaves and blocks used on sailing vessels use bearings made of self-lubricating polymeric materials. In many cases, the lines are sheeted or secured under high tension for long periods of time. This may cause permanent deformation of one or more bearings in the critical zone, which greatly impairs free rotation of the outer race.

Finally, it would be desirable in many cases to provide a sheave or pulley or its equivalent that is lighter in weight and/or smaller in size than conventional devices, but still having the same strength or load capacity. This is especially true in racing sailboats, in which windage and weight are important considerations.

SUMMARY OF THE INVENTION

In accordance with the present invention, an outer rigid race of a conventional sheave is not employed. The line directly engages a plurality of outwardly exposed roller bearing means to provide rotary support for the line.

The assembly of the present invention comprises a central hub or inner race having a central axis. The inner race has a continuous outwardly facing bearing surface extending around the central axis. A plurality of closely spaced roller bearings are disposed around the inner race, with the bearing surfaces of the bearings being in rolling engagement with the bearing surface of the race. The central portions of the roller bearings are exposed axially outwardly and are directly engaged by a line under tension.

Means are provided to retain the outer ends of the roller bearings and to allow the bearings to rotate and circulate around the bearing surface of the inner race. The retaining means may comprise a pair of spaced rings rotatably disposed on the inner race and having inwardly facing continuous grooves which receive the ends of the rollers. The rings may define the sides of a V-shaped groove to center the line on the exposed rollers. As the line moves over the bearings, the bearings rotate and also, together with two rings, move in a path around the race. The speed of recirculation of the bearings and rings is substantially equal to the speed of movement of the line.

In another embodiment, the rollers may have small stubs at the ends which are retained in opposed circulating grooves. The rollers may be cylindrical in shape or concave. In order to reduce friction on the ends of the rollers, a race of ball bearings may be interposed between the end of the roller race and the cheek or side plate of the block.

Each of the roller bearings which are in contact with the flexible line deflect or bend the line to an equal degree. As a consequence, each roller which is subjected to a load from the line bears the load equally, with a uniform distribution of the load. Thus, none of the bearings are more highly loaded than others, as in the case of a conventional sheave having an outer rigid race. The assembly of the present invention can have the same load capacity as a conventional sheave but with a reduced weight and diameter.

Also, since no outer sheave is employed, the assembly of the present invention has a diameter which is inherently smaller than a conventional sheave and is inherently lighter in weight than a conventional sheave.

DESCRIPTION OF THE PREFERRED EMBODIMENTS

Figure 1:
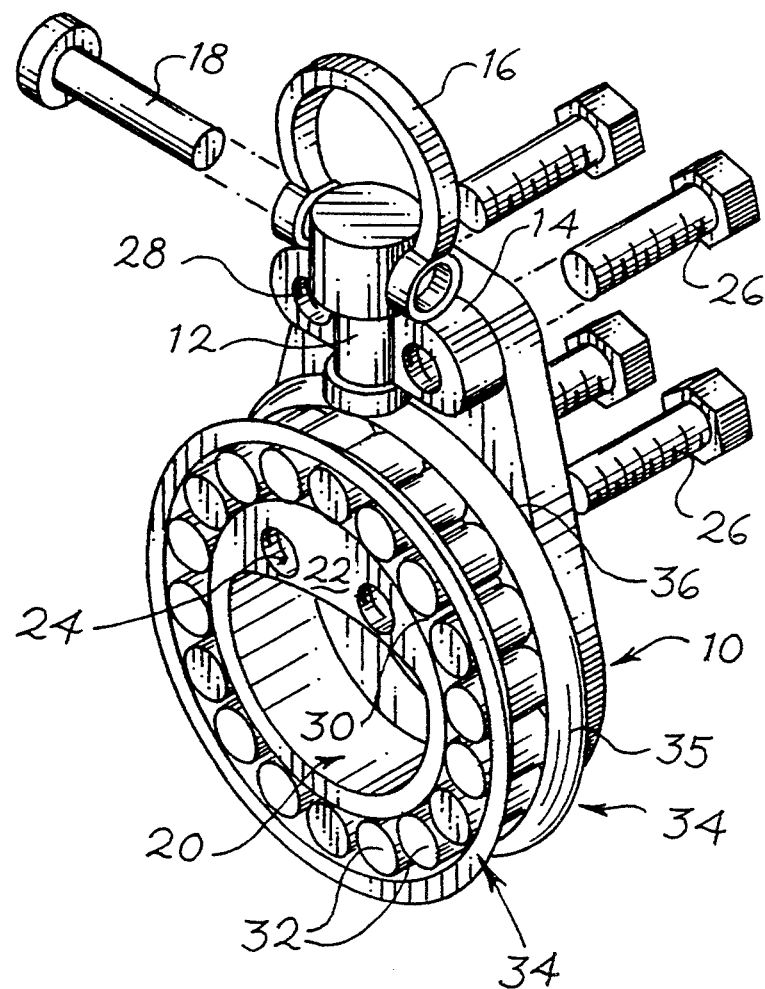
FIG. 1 is a perspective view of the bearing assembly of the present invention, with one of the side plates removed to better show the interior features.

FIG. 1 illustrates a bearing assembly in the form of a block or pulley having a pair of side plates or cheeks 10, of which only one is shown for the sake of clarity, it being understood that a second cheek is disposed and secured over the open side of the assembly. Other conventional components may include an upright post 12 retained in a head spacer 14 between the cheeks, and a shackle 16 connected to the outer end of the post by a transverse pin 18. The assembly includes an inner hub or race 20, which may be hollow and have a thickened wall portion 22 containing openings 24 therethrough. Parallel fasteners such as 26 extend through the cheeks 10 and openings 24 and through the cheeks and openings 28 to hold the assembly together.

The above is a description of conventional elements which are routinely employed to support the inner race 20 of a sheave. Many other types of supports for the inner race may be employed, depending on the application. For example, the inner race 20 may be supported directly by bolts through the openings 24 to a different form of support structure.

Supported between the cheeks 10 is a bearing assembly of the present invention. Unlike a conventional pulley, having a rotating, rigid outer grooved race for receiving a flexible line, the bearings in the assembly as shown are outwardly radially exposed and engage the line directly. The side plates or cheeks 10 serve to center the line on the roller bearings and prevent lateral deflection.

In the embodiment shown, the inner race has an outwardly facing continuous bearing surface 30, which is curved or arcuate. In the present example, the surface 30 is a continuous cylindrical band. A plurality of closely adjacent cylindrical roller bearings 32 are rotatably disposed on the bearing surface 30 of the inner race 20. In the embodiment shown, the length of the rollers 32 is substantially equal to the width of the surface 30. The roller bearings, which may be composed of any suitable polymeric or metal material, function to transfer loads directly from the line to the inner race.

The ends of the roller bearings 32 are loosely retained by a pair of spaced guides or rings 34 disposed over opposite ends of the rollers and rotatably disposed at 36 relative to the interior walls of each cheek 10. The rings have inwardly diverging shoulders 35 to urge or center a line under tension into full contact with the rollers and to keep the axial load centered through the block proper to provide fair alignment with the direction of pull.

Figure 5:
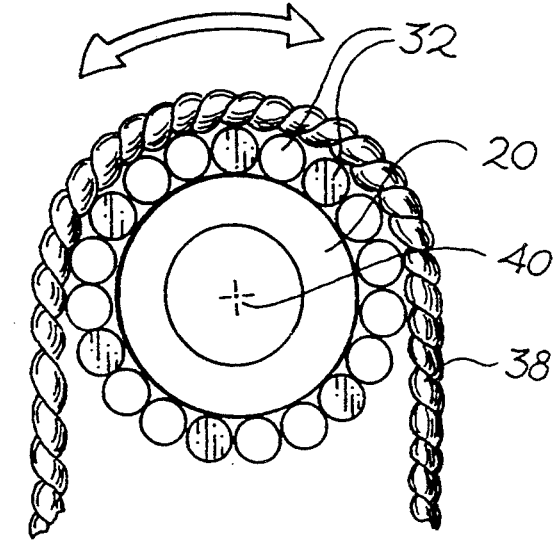
FIG. 5 is a schematic side view of the bearing assembly of the present invention, illustrating engagement of a flexible line with the bearings.
Figure 5:

When engaged by a line 38, as shown in FIG. 5, the rollers 32 rotate on the bearing surface 30 and also travel in a circular path around the bearing surface, or in a clockwise or counterclockwise direction, depending on the direction of movement of the line 38.

As indicated earlier, in a conventional sheave, the line is not carried directly by the bearings but is carried by a grooved rigid outer race, with the bearings between the inner and outer races. Referring to FIG. 5, in a conventional sheave, the bearings at the 12 o'clock position in the Figure would carry the highest loads, with the loads decreasing to zero at the 9 and 3 o'clock positions.

In accordance with the present invention, as shown in FIG. 5, the bearings 32 are exposed and engage directly with the line 38, and each roller deflects the line equally, thereby equally distributing the load between active bearings. Assuming a 180° wrap of the line as shown, the bearings above the 9 and 3 o'clock positions each bear an equal portion of the load or force along lines passing through the central axis 40 of the inner race of hub 20. The force (F) transmitted by each bearing is given by the formula $F = 2T \sin \alpha$ where T is the tension on the line, and $\alpha$ is one-half of the angle of deflection of the line by each roller.

Since the load on the bearings is equal, the practical result is that the bearing assembly can be smaller than a conventional sheave and still have the same working strength. Also, the bearings are less subject to distortion from prolonged static loads because the loads on the bearings are equally distributed.

Figure 2:
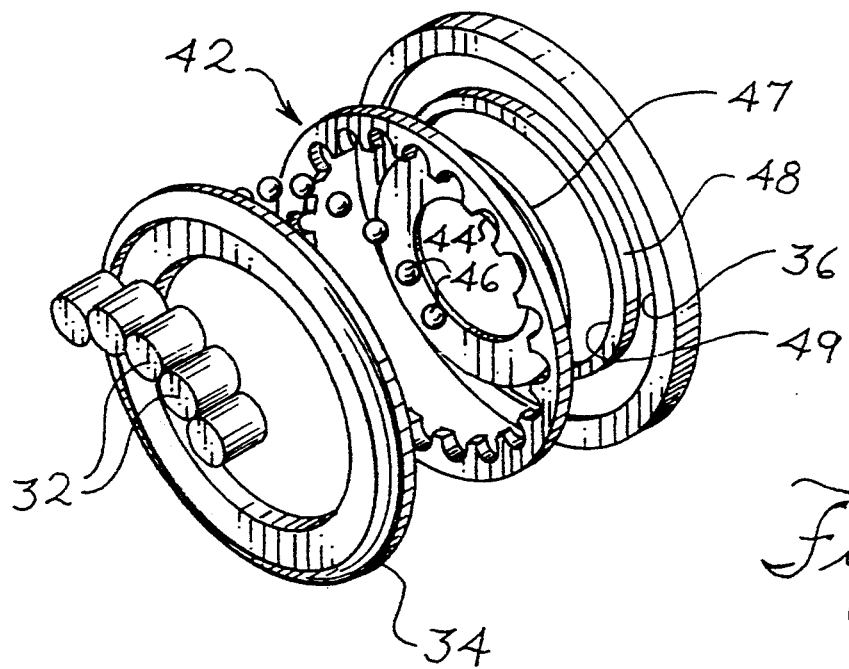
FIG. 2 is a perspective view similar to FIG. 1, additionally showing the use of side thrust ball bearings.

FIG. 2 shows a version similar to FIG. 1 with the provision of an additional feature to minimize friction due to side thrusts on the main roller bearings 32 and resistance to rotation of the rings 34 during circulation of the roller bearings 32.

As shown, a ball bearing cage 42 is provided in the form of a ring having inwardly facing uniformly spaced grooves 44. The grooves 44 are substantially semi-circular and receive a plurality of spaced ball bearings 46. The ball bearings 46 bear on a cylindrical wall of a boss 48 on the cheek and provide bearing separation between the main ring 34 and the inwardly facing surfaces of the cheek and groove 36, in order to reduce rotational friction in the system. The cage 42 may be omitted, and the ball bearings 46 may be freely disposed in a circular groove of appropriate size and diameter.

In examining the FIG. 2 assembly in more detail, it may be seen that the inner wall of the cheek 10 has a circular groove 36 defining an inner circular rib or boss 48. The ball bearing cage 42 has an outwardly facing circular rib 47 received within the opening 49 defined by boss 48. The ball bearings 46 thus bear on the outwardly facing ring shaped wall of the bearing retainer 34, and bear inwardly on the rib 48 and outwardly on the groove wall 36.

Figure 3:
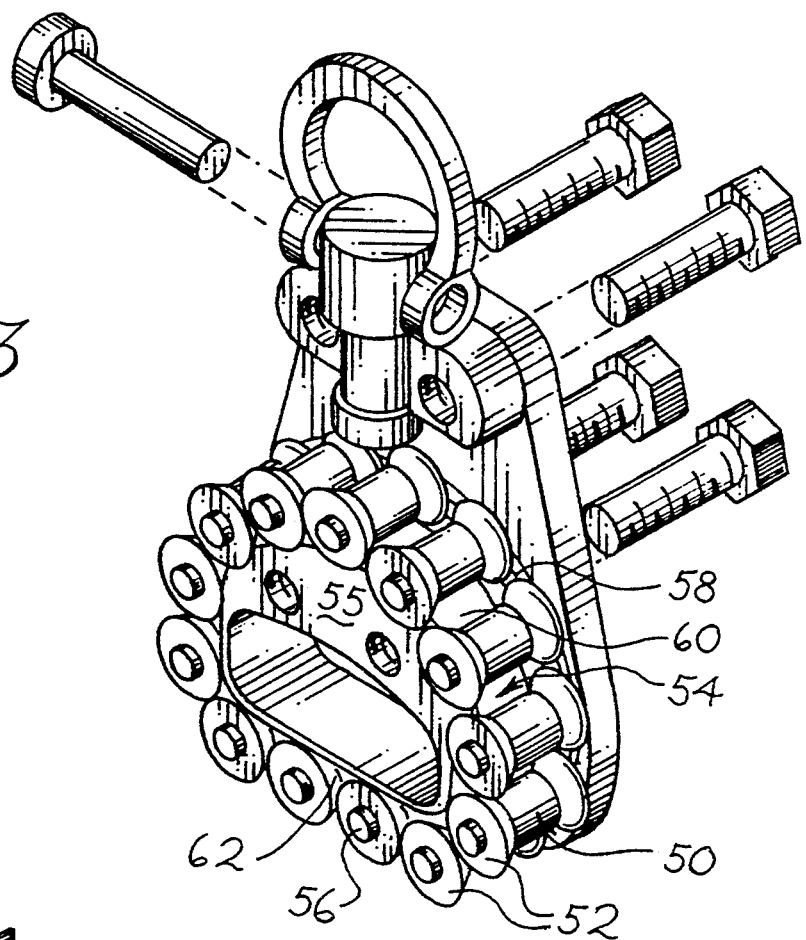
FIG. 3 is a perspective view similar to that shown in FIG. 1, illustrating a different form of inner race and type of roller bearings.

FIG. 3 shows another embodiment having different forms of rollers and race, with the remaining conventional elements being the same as shown in FIG. 1. In this embodiment, the rollers 50 are spool shaped and have a central cylindrical portion and end flanges 52. The cylindrical portion of rollers 50 ride on the continuous bearing surface 54 of the inner race 55, with the flanges 52 extending over the sides of the surface. A short cylindrical stub 56 of reduced diameter extends from both ends of the rollers. The stubs 56 are rotatably and slidably received in a conforming slot or groove 58 provided on or formed into the interior wall of each cheek 10.

In the FIG. 3 embodiment, the bearing surface 54 of the inner race is not cylindrical or circular, but is substantially D-shaped and comprises an outwardly facing curved bearing surface portion 60 in the region where the rollers 50 are engaged by the line, continuous with a relatively straight portion 62 where the rollers are not loaded but are circulating back from an unloaded to a loaded zone. The grooves 58 in the cheeks follow a similar path.

It will be appreciated that a block or sheave typically has a fixed support, which predetermines the sector of the block that will be engaged by the line. Economies of friction and parts are realized by using a curved or cylindrical inner race in the loaded zone and a straighter return race in the unloaded zone, since fewer rollers are needed, and the fewer rollers create less friction. In addition, the inner race may have a thicker wall 61 in the loaded region than in the return region to provide maximum strength at minimal weight.

Regardless of the means employed to retain the ends of the roller bearings, it will be appreciated that the end portions of the bearings and their respective retaining rings or slots are designed and arranged such that they do not carry any appreciable load from the line, and the load is transferred directly from a central portion of the bearing into the inner race.

Figure 4:
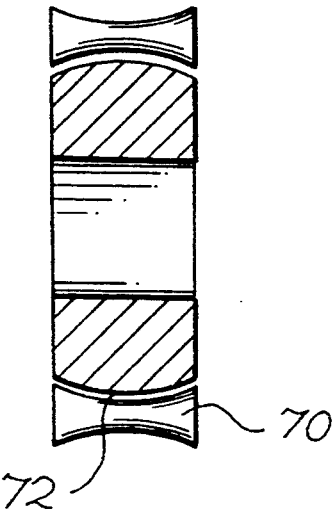
FIG. 4 is a partial sectional view through a portion of the bearing assembly, showing the use of a concave roller.

In order to simplify production, the continuous bearing surface of the inner race is flat, for the purpose of receiving loads from cylindrical bearings. As shown in FIG. 4, however, it is also possible for the rollers 70 to be concave, with the bearing surface 72 of the inner race being convex.

A mathematical comparison has been performed to compare a conventional sheave having a rigid outer grooved race, and the bearing assembly of the present invention. The loads on the roller in the 12 o'clock position of FIG. 5 were evaluated. Assuming a 180° wrap and tension (T) on the line, the uppermost roller in a conventional sheave will bear a force equal to 8T/#rollers. In the assembly of the present invention, the same roller will carry a force equal to 6.2832T/#rollers, approximately 79% of the conventional load, or greater than a 20 percent reduction in load.

I claim:

1. A bearing block for rotatably supporting and engaging a flexible elongate member under tension, said bearing block comprising a pair of spaced side checks, an inner race secured between said side checks, said inner race having an outwardly facing bearing wall, a plurality of roller bearings in rolling contact with said beating wail and spaced from said side checks, said roller beatings being outwardly radially exposed and directly supporting said elongate flexible member,- retaining means for retaining said roller bearings in a movement path along said beating wail, and a plurality of bail bearings between said roller bearings and said side checks.

2. The bearing block of claim 1 wherein said retaining means comprises a pair of spaced rings disposed over the ends of said roller bearings.

3. The bearing block of claim 1 wherein said retaining means comprising grooves in said cheeks.

4. The bearing block of claim 1 wherein said roller bearings comprise shaft stubs extending from the ends thereof, and grooves in said side checks for rotatably and slidably receiving said stubs.

5. The bearing block of claim 1 wherein said continuous bearing wall is flat.

6. The bearing block of claim 1 wherein said roller bearings are concave.

7. The bearing block of claim 1 wherein said continuous bearing wall is cylindrical.

8. The bearing block of claim 1 wherein said continuous bearing wall comprises a curved portion and relatively straight portion.

* * * * *